(12) United States Patent
Choi et al.

(10) Patent No.: US 7,697,227 B2
(45) Date of Patent: Apr. 13, 2010

(54) HARD DISK DRIVE

(75) Inventors: Byoung-Gyou Choi, Suwon-si (KR); Kwang-Kyu Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 643 days.

(21) Appl. No.: 11/648,552

(22) Filed: Jan. 3, 2007

(65) Prior Publication Data

US 2007/0171567 A1     Jul. 26, 2007

(30) Foreign Application Priority Data

Jan. 23, 2006    (KR) ...................... 10-2006-0006626

(51) Int. Cl.
    *G11B 33/14*    (2006.01)
(52) U.S. Cl. ........................................................ 360/68
(58) Field of Classification Search ....................... None
    See application file for complete search history.

(56) References Cited

U.S. PATENT DOCUMENTS

| 4,725,904 | A |   | 2/1988 | Dalziel |   |
|---|---|---|---|---|---|
| 6,238,467 | B1 | * | 5/2001 | Azarian et al. | 96/135 |
| 6,266,208 | B1 | * | 7/2001 | Voights | 360/97.02 |
| 6,473,264 | B2 | * | 10/2002 | Bae et al. | 360/97.02 |
| 6,876,514 | B1 | * | 4/2005 | Little | 360/97.02 |
| 7,239,475 | B1 | * | 7/2007 | Lin et al. | 360/97.02 |
| 7,349,178 | B2 | * | 3/2008 | Tadepalli et al. | 360/97.02 |
| 7,369,356 | B2 | * | 5/2008 | Iwase et al. | 360/97.02 |
| 2003/0218829 | A1 | * | 11/2003 | Hong et al. | 360/97.02 |
| 2005/0185327 | A1 | * | 8/2005 | Voights et al. | 360/97.03 |

FOREIGN PATENT DOCUMENTS

| JP | 03-063991 |   | 3/1991 |
|---|---|---|---|
| JP | 2005-251252 |   | 9/2005 |
| KR | 1020000050563 | A | 8/2000 |
| KR | 20-352253 |   | 4/2004 |

* cited by examiner

*Primary Examiner*—Mark Blouin
(74) *Attorney, Agent, or Firm*—Volentine & Whitt, PLLC

(57) ABSTRACT

A hard disk drive includes a disk pack having at least one disk for recording and/or storing data and a spindle motor that support and rotates the disk, a base to which the disk pack is mounted, a cover that covers an upper surface of the base, and a respective filter disposed close to each of at least one of the major surfaces of the disk and extending in the radial direction of the disk including over at least an inner peripheral region of the disk. The filter has an absorbent layer capable of absorbing particles that come in contact with it. Particles on the surface of the disk, from the inner to the outer peripheral regions of the disk, are removed by the filter when the disk is rotated and the particles are flung off of the disk. Thus, particles will not damage the magnetic head(s) of the hard disk drive nor will the particles cause errors to occur in the recording and/or reproducing of data.

4 Claims, 4 Drawing Sheets

HARD DISK DRIVE

BACKGROUND OF THE INVENTION

1. Field of the Invention

The present invention relates to a hard disk drive. More particularly, the present invention relates to a hard disk drive having a filter for filtering particles within a casing of the hard disk drive.

2. Description of the Related Art

Hard disk drives (HDDs) are memory devices which can record and reproduce large amounts of data at high speed. Accordingly, HDDs are widely used as auxiliary memory devices for computer systems. Recently, there has been a demand for a compact HDD which can be used in portable electronic devices such as laptop computers, PDAs, and mobile phones. In fact, a compact HDD having a diameter of 0.85 inches, similar to that of a coin, has been actually developed and is expected to be used for mobile phones in the near future.

Typically, an HDD includes: a disk on which data is recorded, a spindle motor for rotating the disk, an actuator arm having a magnetic head that can record data on the disk and/or reproduce data from the disk, a support shaft that supports the actuator arm with the magnetic head disposed above a recording surface of the disk, and a voice coil motor (VCM) for swinging the actuator arm about the longitudinal axis of the support shaft to position the magnetic head over the disk. More specifically, the actuator arm is swung around the axis of the support shaft when power is applied to the spindle motor to rotate the disk and to the voice coil motor (VCM) to supply current to the voice coil motor (VCM). At this time, the magnetic head is moved over a recording surface of the rotating disk to read or write data from or onto the disk. Also, the HDD includes a base to which the aforementioned components are mounted, and a cover that is assembled to the base to enclose the components.

However, such an HDD is extremely vulnerable to particles such as dust or foreign materials. For example, particles can adhere to the recording surface of the disk. In this case, errors are very likely to occur during the recording and/or reproducing of data. Also, the magnetic head may be damaged. Accordingly, the base and cover of the HDD are generally assembled to each other after particles have been completely removed from the components that are to be enclosed by the cover. Regardless, particles can still intrude into the HDD during assembly or through air that enters the assembled HDD and remain on the disk. Each of the particles typically has a diameter of less than about 0.3 μm.

Thus, an air filter is provided on the cover to remove particles in the HDD. The air filter is disposed in a corner of the inner surface of the cover. The air filter is narrow and is oriented perpendicular to the recording surface of the disk. Therefore, the air filter filters particles thrown off of the outer peripheral portion of the disk due to the rotation of the disk.

However, the linear velocity of the outer peripheral portion of the rotating disk is greater than that of the inner peripheral portion thereof. Therefore, particles on the outer peripheral region of the disk are flung off of the disk at a relatively high velocity and are then trapped as they pass through the filter. In contrast, particles on the inner peripheral portion of the disk having a relatively low velocity. In particular, the linear velocity of the inner peripheral portion of a disk of a micro drive is low because the disk is small and the rate (RPMs) at which the disk is rotated is low. Thus, the particles on the inner peripheral portion of the disk tend not to move very far from the inner peripheral portion when the disk is rotating. Hence, these particles are never filtered out and the particles remain on the disk. Therefore, the magnetic head may be damaged by the particles or errors may occur during the recording and reproducing of data. Also, in a conventional HDD in which the disk has recording surfaces on both sides thereof, particles on the lower recoding surface of the disk are not removed by the filter.

SUMMARY OF THE INVENTION

An object of the present invention is to provide a hard disk drive that prevents particles from damaging its magnetic head (s) and from causing errors during the recording and reproduction of data.

Another object of the present invention is to provide a hard disk drive which can effectively remove particles that have accumulated anywhere on a surface of a disk, including on the inner peripheral (ID) region of the disk and even in the case of a micro drive having a diameter of less than 1 inch.

Still another object of the present invention is to provide a hard disk drive which can remove particles that have accumulated on both surfaces of a disk.

According to one aspect of the present invention, there is provided a hard disk drive comprising a disk pack including at least one disk for recording and/or storing data and a spindle motor that supports and rotates the disk, a base having an upper surface on which the disk pack is mounted, a cover covering the upper surface of the base, and a respective absorption type of filter disposed adjacent each of at least one of the upper, and lower surfaces of the disk. The disk pack may have only one disk. The disk may be a micro drive having a diameter of no more than 1 inch. Each filter includes an absorbent layer capable of absorbing particles that may have remained on the disk and preferably, an adhesive layer coating the absorbent layer and by which the absorbent layer is fixed in place in the hard drive. In any case, the filter extends over at least an inner peripheral region of the disk in a crosswise direction of the disk. Therefore, the filter will absorb particles scattered from the inner peripheral region when the disk is rotated.

Preferably, first and second ones of the filters are provided above and below the disk, respectively. The first filter may be installed on an inner surface of the cover with the absorbent layer thereof attached directly to the inner surface. The absorbent layer of the first filter may extend approximately in a radial direction of the disk and span an inner peripheral region of the upper surface, an outer peripheral region of the upper surface, and an intermediate region of the upper surface. The absorbent layer of the second filter is attached directly to a frame constituted by the base and/or a hub of the spindle motor.

The base may comprise a lower plate forming the bottommost surface of the hard disk drive and a step protruding from the lower plate toward the disk. In this case, at least part of the absorbent layer of the second filter is directly attached to an upper surface of the step. Another part of the absorbent layer of the second filter may be directly attached to an upper surface of an outer wing portion of the spindle motor hub. Preferably, the absorbent layer of the second filter spans an inner peripheral region of the lower surface, an outer peripheral region of the lower surface, and an intermediate region of the lower surface.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF THE PREFERRED EMBODIMENTS

Figure 1:
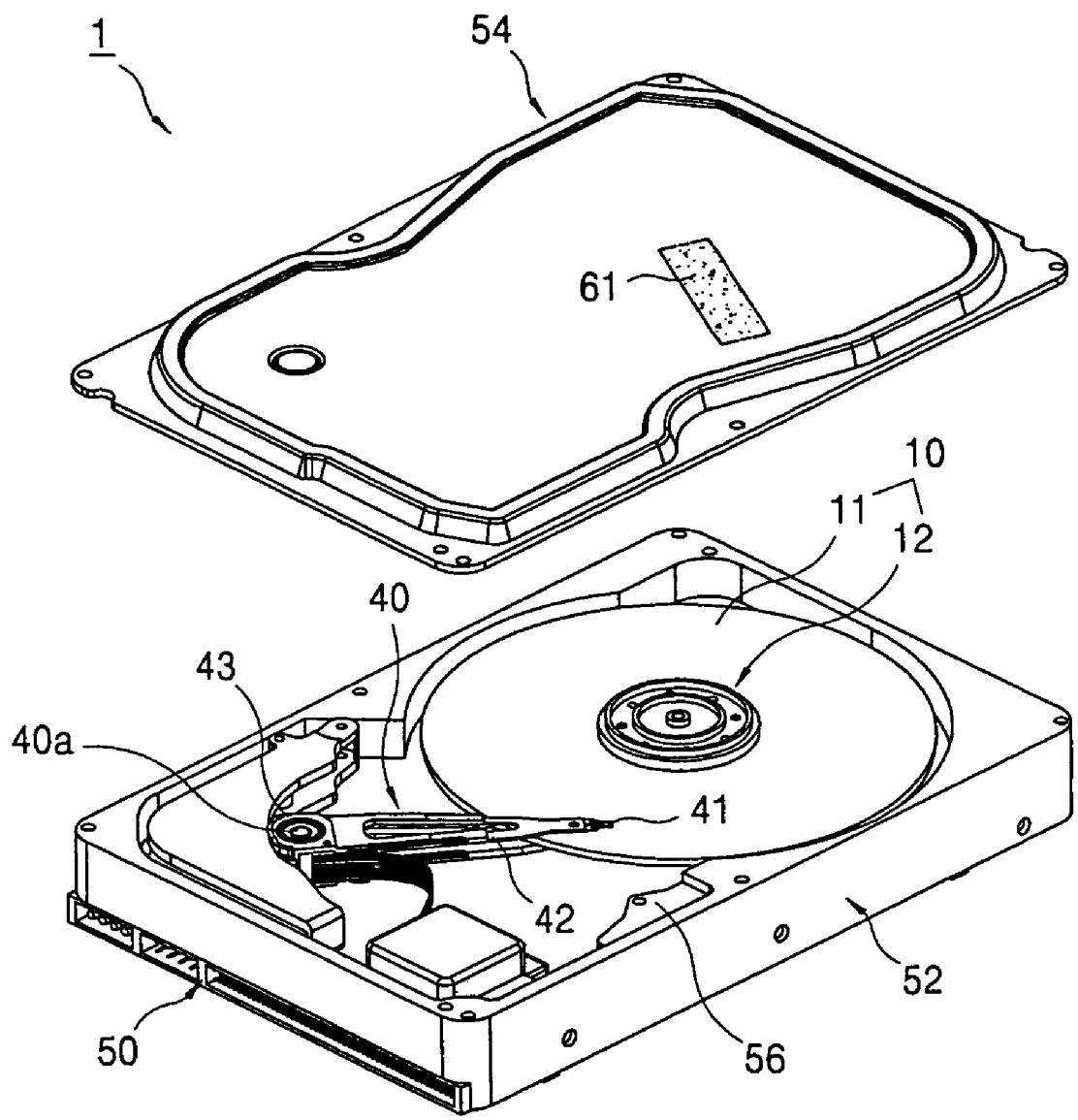
FIG. 1 is a partially exploded perspective view of an embodiment of a hard disk drive according to the present invention.
Figure 2:
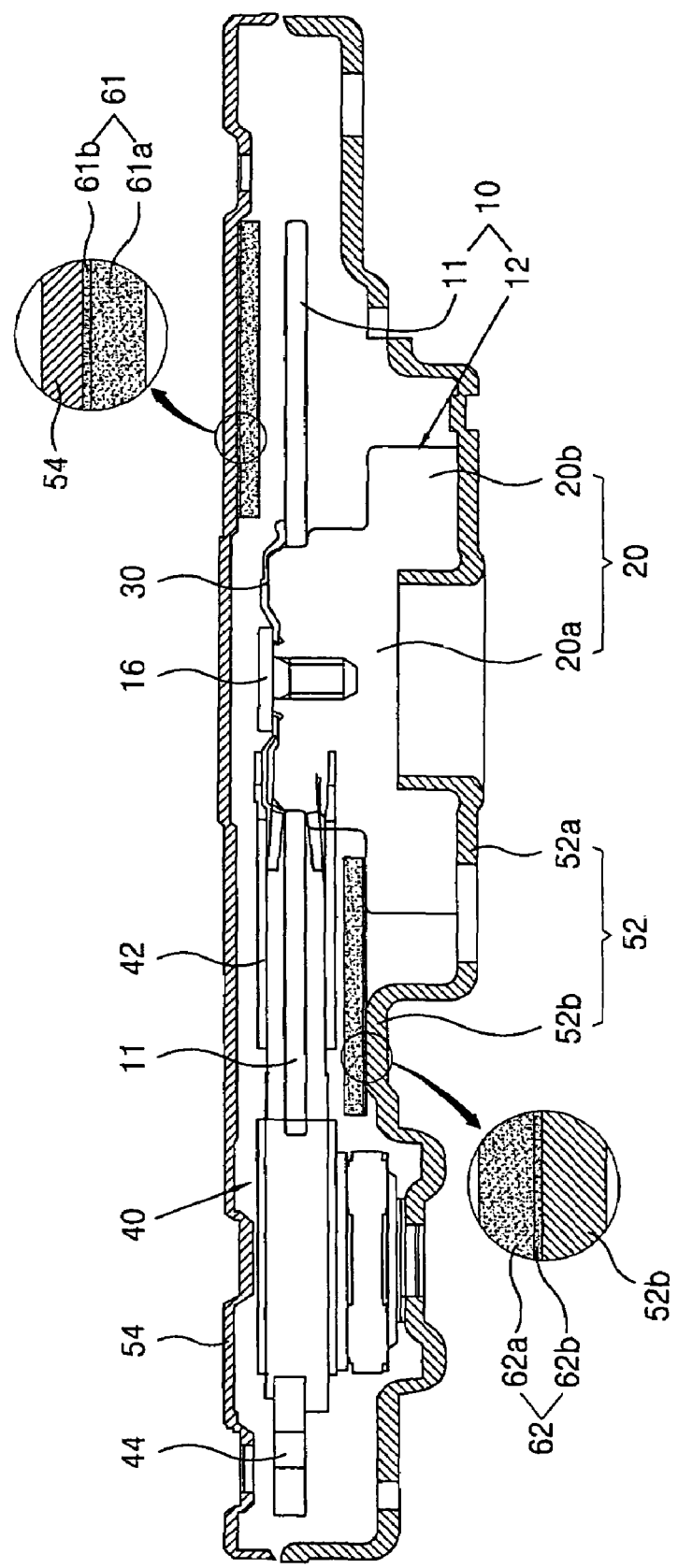
FIG. 2 is a cross-sectional view of the hard disk drive of FIG. 1.
Figure 3:
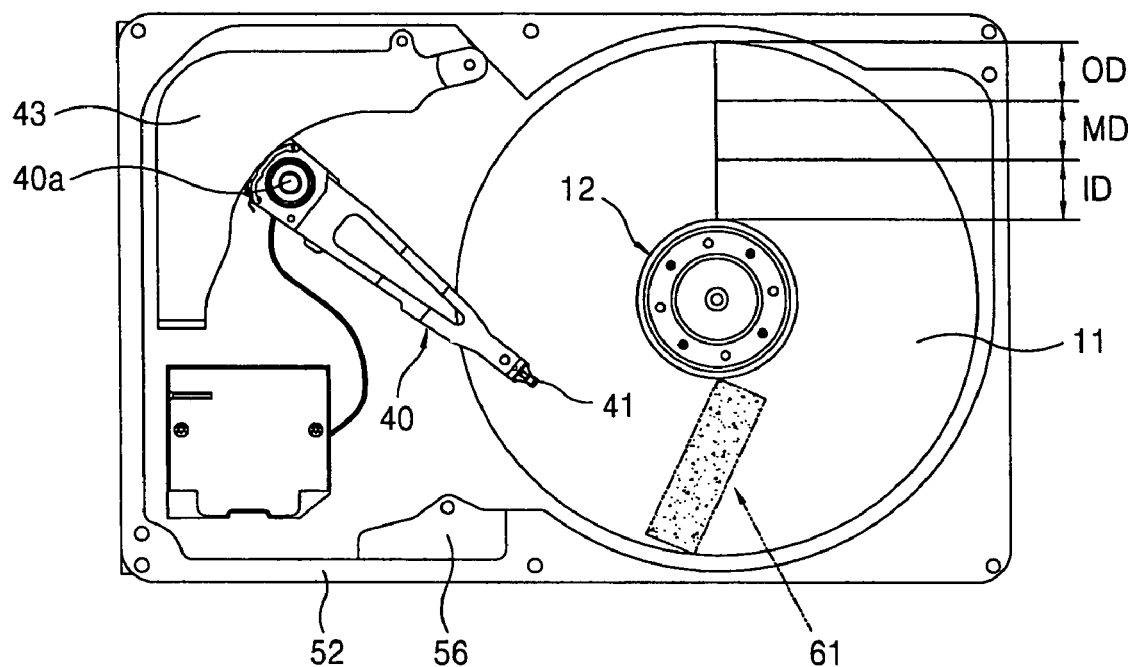
FIG. 3 is a plan view of the hard disk drive of FIG. 1.

Referring to FIGS. 1, 2, and 3, a hard disk drive (HDD) 1 according to the present invention includes a disk pack 10 having at least one disk 11 for recording and/or storing data and a spindle motor 12 for supporting and rotating the disk 11, a head stack assembly (HSA) 40 for reading or recording data from or on the disk 11, a base 52 to which these parts are assembled, a printed circuit board socket assembly (PCBA) 50 coupled to a lower portion of the base 52 for connection to a printed circuit board (PCB) that controls various parts of the HDD, and a cover 54 covering an upper portion of the base 52.

The HSA 40 includes a support shaft 40a, an actuator arm 42 coupled to and supported by the shaft 40a, a magnetic head 41 supported at the end of the actuator arm 42 for recording data on the disk 11 or reading recorded data from the disk 11, a support shaft holder 43 rotatably supporting the shaft 40a to which the actuator arm 42 is coupled such that the arm 42 is rotated about the longitudinal axis of the shaft 40a when the shaft 40a is rotated in the support shaft holder 43, and a bobbin (not shown) extending from the support shaft holder 43 in a direction opposite to that in which the actuator arm 42 extends. A voice coil 44 is wound around the bobbin and is interposed between magnets (not shown) of a voice coil motor VCM (not shown).

The VCM rotates the actuator arm 42 according to Fleming's left hand rule to move the magnetic head 41 to a desired position on the disk 11 while the disk is being rotated by the spindle motor 12. More specifically, applied current flowing through the voice coil 44 induces a magnetic field between the magnets. As a result, a force is applied to the bobbin in a direction perpendicular to the direction of current flow through the windings of the coil. Accordingly, the actuator arm 42 is rotated so that the magnetic head 41 supported at the end of the actuator arm 42 moves across the rotating disk 11 to search and access tracks of the disk 11. Information accessed from the tracks by the magnetic head 41 undergoes processing to convert the information into digital signals.

Although not shown in detail, a suspension biases the magnetic head 41 towards the surface of the disk 11. The suspension includes a slider on which the magnetic head 41 is mounted, and an end tab that constitutes an end portion of the suspension. The end tab is parked on a ramp 56 when the power is off and the disk 11 stops rotating. At this time, the magnetic head 41 is prevented from contacting the surface of the disk 11. The operation in which the end tab is parked on the ramp 56 is referred to as ramp loading.

The disk pack 10 in the embodiment of the HDD of FIGS. 1-3 employs a single disk. Also, the disk 11 is for a micro drive having a diameter of 1 inch or less. Each of the upper and lower surfaces of the disk 11 is a recording surface. Thus, the HSA 40 includes a pair of magnetic heads 41, one of which is disposed above the level of the upper surface of the disk 11 and the other of which is disposed below the level of the lower surface of the disk 11. Each recording surface of the disk 11, as shown in FIG. 3, has an outer peripheral region (OD region), an intermediate region (MD region), and an inner peripheral region (ID region).

Referring back to FIG. 2, the spindle motor 12 includes a spindle motor hub 20 supporting the disk 11, a clamp 30 coupled to the upper portion of the spindle motor hub 20, and a clamp screw 16 securing the clamp 30 to the spindle motor hub 20 to fix the disk 11 in place on the hub. The spindle motor hub 20 includes a hub body 20a around which the disk 11 extends and an outer wing portion 20b extending radially outwardly from the lower portion of the hub body 20a. The disk 11 is fixed to the upper portion of the hub body 20a so as to rotate therewith.

The HDD 1 also includes first and second filters 61 and 62 disposed close to the upper and lower surfaces of the disk 11, respectively. Each of the first and second filters 61 and 62 is preferably an absorption type of filter. More specifically, as shown in FIG. 2, the first and second filters 61 and 62 include respective absorbent filter layers 61a and 62a and adhesive layers 61b and 62b disposed on the absorbent filter layers 61a and 62b. The adhesive layers 61b and 62b attach the absorbent filter layers 61a and 62a to portions of the HDD that constitute a frame. Thus, the first and second filters 61 and 62 can be easily attached at desired positions in the HDD without the need for specialized brackets or the like.

With respect to these positions, the first filter 61 is attached to the inner surface of the cover 54, as shown in FIG. 2. The first filter 61 may have almost the same size as the disk 11. However, such a large filter would be somewhat costly. In the present embodiment, therefore, the first filter 61 is rectangular and extends lengthwise across the disk 11 in approximately the radial direction of the disk 11, as shown in FIGS. 1 and 3. That is, the first filter 61 is long enough to cross the OD, MD, and ID regions of the upper recording surface (please refer to FIG. 3) of the disk 11. Particles flung from the OD, MD, and ID regions of the upper surface of the disk 11 when the disk 11 rotates are thus absorbed by the first filter 61.

Figure 4:
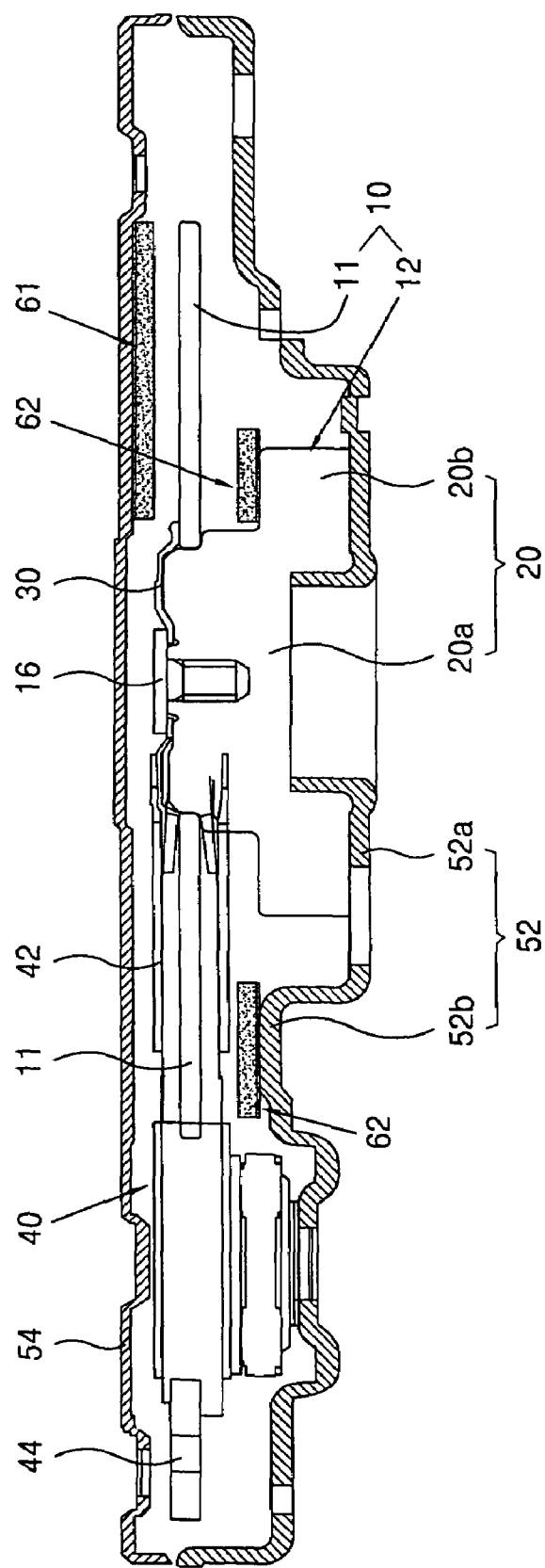
FIG. 4 is a cross-sectional view of another embodiment of a hard disk drive according to the present invention.

The second filter 62, as shown in FIG. 2, is attached to the base 52 and the spindle motor hub 20, as shown in FIG. 2, so as to be disposed close to the lower surface of the disk 11. More specifically, the base 52 includes a lower plate 52a forming the bottommost surface of the HDD and a step 52b protruding from the lower plate 52a toward the disk 11. The second filter 62 is attached to the upper surface of the step 52b because the upper surface of the step 52b is the portion of the base 52 that is closest to the lower surface of the disk 11. The second filter 62 is also attached to the upper surface of the outer wing portion 20b of the spindle motor hub 20. The second filter 62 can be unitary, as shown in FIG. 2, or can comprise discrete sections each of which is attached to a respective one of the step 52b of the base 52 and the outer wing portion 20b of the spindle motor hub 20 as shown in FIG. 4. In any case, the second filter 62 is disposed as close as possible to the lower surface of the disk 11 and confronts the OD, MD, and ID regions of the lower recording surface of the disk 11.

The HDD 1 operates as follows. First, power is applied to the HDD 1 and current is supplied to the voice coil 44. Thus, the disk 11 is rotated and the actuator arm 42 rotates around the longitudinal axis of the support shaft 40a. Accordingly, the magnetic head(s) 41 is/are moved over the recording surface(s) of the rotating disk 11 to read or write data from or onto the disk 11.

At this time, particles on both surfaces of the disk 11 are scattered from the surfaces of the disk 11 due to the rotation of the disk 11. Accordingly, the particles are absorbed by the first and second filters 61 and 62 situated above and below the disk 11. In particular, particles on the ID regions of the disk 11 are removed even if they are not scattered very far from the surfaces of the ID regions because the first and second filters 61 and 62 are disposed close to the ID regions. Thus, the magnetic heads 41 will not be damaged by the particles.

Next, the VCM rotates the actuator arm 42 clockwise about the longitudinal axis of the support shaft 40a when the power to the HDD 1 is cut off and the disk 11 stops rotating. Accordingly, the end tab is laid to rest on the ramp 56 so that the magnetic head(s) 41 is/are parked.

According to the present invention, as described above, particles on a surface of a disk from an OD region to an ID region of the surface are permanently removed from the disk when the disk is rotated. In addition, particles can be effectively removed from both surfaces of the disk. Therefore, particles will not damage the magnetic head(s) or cause errors in the recording and reproducing of data. In particular, damage to the magnetic head(s) of a micro drive or errors during the recording and reproducing of data in a micro drive can be prevented.

Finally, although the present invention has been shown and described in connection with the preferred embodiments thereof, the present invention is not so limited. For example, although the HDD of the present invention has been shown and described as having a single disk, an HDD according to the present invention can have two or more disks. Thus, various changes to the disclosed embodiments, as would be appreciated by those skilled in the art, are seen to be within the true spirit and scope of the invention as defined by the claims.

What is claimed is:

1. A hard disk drive comprising:
   a disk pack including a disk having upper and lower surfaces at least one of which is a data recording surface, and a spindle motor to which the disk is mounted;
   a base to which the disk pack is mounted, the base having an upper surface over which the disk pack is disposed;
   a cover covering an upper surface of the base; and
   a respective filter disposed adjacent each of at least one of the upper and lower surfaces of the disk, each said filter including an absorbent layer extending over least an inner peripheral region of the disk in a crosswise direction of the disk, wherein by the filter will absorb particles scattered from the inner peripheral region when the disk is rotated;
   wherein said respective filter disposed adjacent each of at least one of the upper and lower surface of the disk comprises a first filter disposed above the upper surface of the disk and a second filter disposed below the lower surface of the disk;
   wherein the spindle motor has a hub on which the disk is mounted, and the absorbent layer of the second filter is attached directly to both the base and to the spindle motor hub.

2. The hard disk drive of claim 1, wherein the base comprises a lower plate forming the bottommost surface of the hard disk drive, and a step protruding from the lower plate toward the disk so as to have an upper surface disposed at a level above that of the lower plate, and part of the absorbent layer of the second filter is attached directly to the upper surface of the step.

3. The hard disk drive of claim 1, wherein the spindle motor hub has a hub body to which the disk is fixed, and an outer wing extending radially outwardly from a lower portion of the hub body, and part of the absorbent layer of the second filter is attached directly to an upper surface of the outer wing portion of the spindle motor hub.

4. The hard disk drive of either claim 3, wherein the absorbent layer of the second filter spans an inner peripheral region of the lower surface, an outer peripheral region of the lower surface, and an intermediate region of the lower surface located between the inner and outer peripheral regions of the lower surface.

* * * * *